Patented Nov. 29, 1949

2,490,003

UNITED STATES PATENT OFFICE 2,490,003

LEATHER-LIKE POLYESTER-POLYAMIDES AND PROCESS OF PRODUCING SAME

David W. Jayne, Jr., Old Greenwich, Harold M. Day, Cos Cob, and Edward L. Kropa, Old Greenwich, Conn., assignors to American Cyanamid Company, New York, N. Y., a corporation of Maine No Drawing. Application December 18, 1946, Serial No. 717,089

9 Claims. (Cl. 260—77)

This invention relates to high molecular weight polyester-polyamides and more specifically, to cross-linked polyester-polyamides.

Linear polyesters of high molecular weight are known in the art. These materials are prepared by the reaction of dihydric alcohols with dicarboxylic acids or by the reaction of a hydroxy acid with itself. Moreover, cross-linked polyesters wherein the linear polyesters are cross-linked by means of a small proportion of a polyfunctional compound are described in the art as, for example, in Patent No. 2,363,581.

Linear polyamides of high molecular weight such as the well-known nylon are prepared from aminocarboxylic acids or from polyamines and dicarboxylic acids and are described, for example, in Patents Nos. 2,071,250, 2,130,523 and others.

It is an object of the present invention to prepare cross-linked polyester-polyamides.

It is another object of the present invention to bring about reaction between a polyfunctional compound and a linear polyester-polyamide and thus effect cross-linking of the latter.

It is a further object of the present invention to prepare a high molecular weight, cross-linked polyester-polyamide which is a leather-like material.

Another object of the present invention is the preparation of a resinous product which can be readily drawn or calendered.

Still another object of the present invention is the preparation of a product, the tensile strength of which can be markedly increased by cold-drawing or calendering.

A further object of the present invention is the preparation of a granular, high molecular weight polyester-polyamide which can be molded under heat and pressure.

A further object of the present invention is the preparation of a sheet of leather-like material which can be calendered in order to improve its pliability, resiliency and strength.

A still further object of the present invention is the production of leather-like products, the properties of which vary from hard and rubbery, i. e., as in sole leather, to soft and pliable, i. e., as in gloves.

Still a further object of the present invention is the preparation of high molecular weight polymers which have a crystalline structure, said crystals attaining a high degree of orientation upon cold-drawing or calendering of the polymer.

Another object of the present invention is a process for producing polyester-polyamides which have leather-like properties and can be calendered and cold-drawn.

These and other objects are attained by bringing about reaction between a primary straight-chain monoalkylolamine and a saturated aliphatic dicarboxylic acid which does not form an anhydride upon heating in a molar ratio of from about 1:0.6 to about 1:1, acid to alkylolamine, and then bring about reaction between the product obtained and a polyfunctional compound which is a polyhydric alcohol, a polyamine, or an aliphatic amino alcohol in which the total number of hydroxyl groups, amino groups, or hydroxyl and amino groups is at least 3, the molar ratio of acid to polyfunctional compound varying from about 1:0.05 to about 1:0.2. Moreover, the molar ratio of the saturated acid to the total monoalkylolamine and polyfunctional compound should be from 1:0.8 to 1:1.1. The product obtained is cured to a tough, strong, leather-like material by heating.

The invention will be described in greater detail in conjunction with the following specific examples in which proportions are given in parts by weight. It should be understood that the examples are merely illustrative and are not intended to be restrictive of the scope of the invention.

Example 1

202 parts of sebacic acid (1.0 mol)
42.7 parts of monoethanolamine (0.7 mol)
10.5 parts of diethanolamine (0.1 mol)

The sebacic acid and monethanolamine are rapidly heated together in an open vessel to 200° C. The mix is then heated in the presence of a stream of nitrogen for 18 hours at 200°–205° C. and the diethanolamine added. Additional heating is carried out for 4 hours in the presence of nitrogen and the product, which is just about at the gel point, is poured into a shallow tray and cured by heating for 16 hours in an oven at 170° C. The cured resin sheet is tough and leathery and may be cold-drawn.

Example 2

101 parts of sebacic acid (0.5 mol)
23 parts of monoethanolamine (0.375 mol)
13 parts of diethanolamine (0.125 mol)

The above ingredients are mixed in a suitable vessel and heated for 4 hours at 200° C. until the resin produced is near gelation. During the heating period, the reaction mixture is agitated by means of a stream of nitrogen.

A sheet of the resulting resin, cured for 8 hours at 170° C., is tough and leather-like.

*Example 3*

101 parts of sebacic acid (0.5 mol)
24.5 parts of monoethanolamine (0.4 mol)
5 parts of diethanolamine (0.05 mol)

The above ingredients are reacted according to the details of Example 2 except that the heating at 200° C. is continued for 6 hours. A sheet of tough, leather-like material is obtained.

*Example 4*

202 parts of sebacic acid (1.0 mol)
49 parts of monoethanolamine (0.8 mol)
10.5 parts of diethanolamine (0.1 mol)

A mixture of the sebacic acid and monoethanolamine is heated rapidly in an open vessel to 200° C. The mix is then transferred to another vessel in which it is heated for 18 hours at 200°–205° C. A stream of nitrogen is passed through the vessel during the heating.

The diethanolamine is then added and the heating continued in the presence of nitrogen to near the gel point, i. e., a period of about 2 hours. The product is poured in a thin layer on a shallow tray and cured by heating in an oven at 170° C. for 16 hours. The cured resin sheet is strong and stiff. It may be cold-drawn to give a springy material with a permanent set.

*Example 5*

202 parts of sebacic acid (1.0 mol)
49 parts of monoethanolamine (0.8 mol)
21 parts of diethanolamine (0.2 mol)

The above ingredients are heated together for 6 hours at 200° C. and the reaction product poured onto a panel and cured for 8 hours at 170° C. A tough, leather-like material is obtained when the thin cured resin sheet is stripped from the panel.

*Example 6*

101 parts of sebacic acid (0.5 mol)
26 parts of monoethanolamine (0.425 mol)
8 parts of diethanolamine (0.075 mol)

The procedure of Example 2 is followed except that the heating at 200° C. is continued for 6 hours. A strong, tough, leather-like material is obtained.

*Example 7*

101 parts of sebacic acid (0.5 mol)
27.5 parts of monoethanolamine (0.45 mol)
5 parts of diethanolamine (0.05 mol)

The procedure of Example 5 is followed except that the heating at 200° C. is continued for 6 hours. A sheet of tough, leather-like material is obtained.

*Example 8*

101 parts of sebacic acid (0.5 mol)
24 parts of monoethnolamine (0.4 mol)
10 parts of diethanolamine (0.1 mol)

The sebacic acid and monoethanolamine are heated rapidly to 200° C. in an open vessel. Heating is continued at that temperature for 20 hours while a slow stream of nitrogen is bubbled through the reaction mixture to prevent oxidation and to aid in the elimination of water.

The diethanolamine is added to the polyamide-polyester reaction product, and the mixture is again heated in an open vessel for 2 hours at 200° C. until the resin is near the gel point. The tough, waxy reaction mixture is poured on a shallow tray and cured by heating in an oven for 16 hours at 170° C. The product so obtained is leathery.

*Example 9*

101 parts of sebacic acid (0.5 mol)
27 parts of monoethanolamine (0.45 mol)
2.5 parts of diethanolamine (0.025 mol)

The procedure of Example 8 is followed, the first prolonged heating period continuing for 24 hours instead of 20 hours. The hard waxy product obtained after the second heating period cures to a leathery product.

A strip of the cured product is warmed to about 150° C. and immediately supercooled by plunging in ice water. The so-treated strip can then be readily cold-drawn by hand from three to four times its original length with a marked increase in strength of the material. If the drawn strip is warmed to 80°–100° C., it retracts to its original length.

A piece of the cured leathery product is calendered and elongated approximately 100% by passing it through cold milling rolls set at 0.023 inch clearance. Recalendering perpendicular to the original direction of calendering does not result in any further elongation in either direction. The calendered sheet is stronger and more pliable than the original sheet; warming the calendered sheet to 100° C. relaxes it to its original dimensions.

X-ray diffraction studies of the calendered sheet both before and after "relaxing" show that the polyester-polyamide resin is a crystallite which becomes highly oriented when calendered or cold-drawn. Physical tests indicate that the tensile strength of the resin increases markedly with elongation.

*Example 10*

808 parts of sebacic acid (4.0 mols)
220 parts of monoethanolamine (3.6 mols)
22 parts of diethanolamine (0.2 mol)

A mixture of the sebacic acid and monoethanolamine is heated rapidly in an open vessel to 200° C. The mix is then transferred to another vessel in which it is heated for 18 hours at 200°–205° C. A stream of nitrogen is passed through the vessel during this heating period.

The diethanolamine is then added and the heating continued in the presence of nitrogen to near the gel point, i. e., a period of about 5 hours. The product is poured in a thin layer on a shallow tray and cured by heating for 16 hours in an oven at 170° C. The cured resin sheet is strong and may be readily cold-drawn. Before cold-drawing, the material is stiff; after drawing, its set is permanent and it is springy.

*Example 11*

202 parts of sebacic acid (1.0 mol)
48 parts of monoethanolamine (0.8 mol)
10 parts of diethanolamine (0.1 mol)

A mixture of the sebacic acid and monoethanolamine is heated rapidly in an open vessel to 200° C. The mix is then transferred to another vessel in which it is heated in an oil bath for 6 hours at 200° C. while passing a stream of nitrogen therethrough.

The diethanolamine is then added, and the heating in continued in the presence of nitrogen for 2 hours more. The mix is then quite viscous and nearly ready to gel. It is therefore poured onto a panel and cured by heating for 16 hours at 170° C.

After cooling, the cured resin sheet is tough, brown and leathery. Strips of the resin, when cold-drawn, yield an amber-colored, strong, tough, transparent "horny" material.

Three samples of the above resin—(1) a strip of the cured sheet, (2) a strip of the cured sheet which has been cold-drawn about 200%, and (3) a strip of the cured sheet which has been cold-drawn about 500%—were examined by X-ray diffraction. Results indicate that (1) is an unoriented crystalline substance whose crystalline units are very small and imperfect while (2) and (3) are crystalline materials whose crystalline units have not been altered measurably as to size or crystalline perfection, but which have undergone an orientation of the highest type.

Three additional samples—(4) a strip of the cured sheet cold-drawn about 500%, then relaxed to original length by warming, (5) a strip of the cured sheet cold-drawn about 200%, and (6) a strip of the cured sheet cold-drawn about 400%—were subjected to physical tests with the following results:

| Sample | Tensile strength | Elongation | Permanent Set | Reduction in Area | Nominal True Tensile Strength | Modulus | Elongation at which modulus is determined | Yield Point |
|---|---|---|---|---|---|---|---|---|
| | P. s. i. | Per cent | Per cent | Per cent | P. s. i. | | Per cent | P. s. i. |
| 4 | 2,300 | 330 | low | 73 | 8,500 | 16,600 | 3 | [1] 2,300 |
| 5 | 8,500 | 42.5 | low | low | 8,500 | 1,450,000 | 1.6 | 7,200 |
| 6 | 6,740 | 15.7 | low | low | 6,740 | 1,850,000 | 1.3 | 6,740 |

[1] Broke at flaw before fully distended.

Example 12

404 parts of sebacic acid (2.0 mols)
110 parts of monoethanolamine (1.8 mols)
14 parts of diethanolamine (0.14 mol)

The sebacic acid and monoethanolamine are placed in a suitable vessel and heated rapidly to a temperature of 200°–205° C. With a stream of carbon dioxide gas bubbling through the mix, heating at 200° C. is continued for 18 hours. The diethanolamine is then added and heating continued for 5 hours.

The viscous mixture is poured onto shallow trays and cured by heating about 16 hours in a vacuum oven at 160° C. The cured resin sheet is stripped from the tray and upon examination, found to be a leather-like material of good strength which can be cold-drawn.

Samples of the cured sheet which have been calendered to 100% and 200% increase in length are tested on a Schopper Paper Tester, the tensile properties determined being tabulated below:

| Sample | Grain | Tensile strength | Elongation | Permanent Set | Modulus | Elongation at which modulus is determined | Yield Point |
|---|---|---|---|---|---|---|---|
| | | P. s. i. | Per cent | Per cent | P. s. i. | Per cent | P. s. i. |
| calendered 100% | with | 2,740 | 147 | 107 | 27,000 | 5.0 | 2,260 |
| calendered 100% | across | 1,765 | 256 | 19.6 | 34,000 | 3.8 | 1,760 |
| calendered 200% | with | 9,800 | 26.2 | 12.5 | 71,000 | 5.0 | None |
| calendered 200% | across | 3,160 | 18.7 | 12.5 | 75,000 | 3.8 | 3,160 |

Example 13

1010 parts of sebacic acid (5.0 mols)
260 parts of monoethanolamine (4.25 mols)
50 parts of diethanolamine (0.5 mol)

The procedure of Example 2 is followed with heating periods of 16½ hours and 4 hours, respectively. The cured product is leather-like, of good strength, and can be cold-drawn.

Example 14

202 parts of sebacic acid (1.0 mol)
48.8 parts of monoethanolamine (0.8 mol)
10.5 parts of diethanolamine (0.1 mol)

The above ingredients are placed in a suitable vessel and while carbon dioxide gas is bubbled through the mixture, it is heated at 200° C. for 5½ hours. The viscous product obtained is poured onto a shallow tray and cured by heating in a vacuum oven at 160° C. for 16 hours. The cured resin sheet, stripped from the tray, is a leather-like material of good strength which can be cold-drawn.

Example 15

1010 parts of sebacic acid (5.0 mols)
244 parts of monoethanolamine (4.0 mols)
75 parts of diethanolamine (0.75 mol)

Following the procedure of Example 12 with heating periods of 17 hours and 1 hour, respectively, a sheet of leather-like material of good strength which can be cold-drawn and which has a brittle point of −14° C. is obtained.

The abrasion resistance of a sample of the cured sheet obtained above was determined on a Du Pont abrader and the data obtained are tabulated below, along with those for "oak" sole leather for purposes of comparison:

| Material | Specific Gravity | Weight Loss, gms./cm.² |
|---|---|---|
| "Oak" Sole Leather | 1.01 | 0.148 |
| Cured sheet | 1.17 | 0.028 |

Example 16

1010 parts of sebacic acid (5.0 mols)
244 parts of monoethanolamine (4.0 mols)
75 parts of diethanolamine (0.75 mol)

The procedure of Example 12 with heating periods of 24 hours and 2½ hours, respectively, is followed. A leather-like material of good strength which can be cold-drawn and which has a brittle point of −12° C. is obtained.

*Example 17*

808 parts of sebacic acid (4.0 mols)
183 parts of monoethanolamine (3.0 mols)
84 parts of diethanolamine (0.8 mol)

The procedure of Example 12 with heating periods of 19 hours and 2 hours, respectively, is followed. A leather-like material of good strength which can be cold-drawn is obtained.

*Example 18*

122 parts of sebacic acid (0.6 mol)
115 parts of sym. diethanolsebacamide (0.4 mol)
15 parts of diethanolamine (0.15 mol)

The sym. diethanolsebacamide, which is prepared from dimethyl sebacate and monoethanolamine reacted in a 1:2 molar proportion, and the sebacic acid are heated for 20 hours at 200° C. while agitation of the reaction mixture is effected by a stream of carbon dioxide. The diethanolamine is added and ½ hour additional heating provided.

The resin obtained is poured on a shallow tray and cured in a vacuum oven at 160° C. for 18 hours. The product is a leather-like material of good strength which can be cold-drawn.

*Example 19*

2020 parts of sebacic acid (10 mols)
549 parts of monoethanolamine (9 mols)
158 parts of diethanolamine (0.75 mol)

The sebacic acid and monoethanolamine are placed in a stainless-steel, closed kettle fitted with a mechanical agitator. The kettle is heated in an oil bath and swept with carbon dioxide while the temperature is maintained at 200°–205° C. for 17 hours.

The diethanolamine is added and heating continued for 1½ hours. The viscous resin is then poured into a suitable vessel and allowed to cool to a waxy material. The wax is then broken up and placed in a covered, jacketed mixer fitted with a horizontal shaft along which are fitted, at right angles to the shaft, a series of straight blades. The mixer is heated with hot oil at 190° C., and an atmosphere of carbon dioxide is maintained over the batch as it is cured. The resin is continuously stirred mechanically while curing and until the cured material has cooled to about 80° C.

The product is leather-like and of good strength and moldability, and it can be cold-drawn.

*Example 20*

202 parts of sebacic acid (1.0 mol)
57 parts of monoethanolamine (0.85 mol)
10.5 parts of diethanolamine (0.1 mol)

The sebacic acid and monoethanolamine are heated to 200° C. and maintained at that temperature for 17 hours while a stream of carbon dioxide gas is bubbled through the mix. The diethanolamine is added, heating is continued for ½ hour, and the viscous resin is then cured in thin layers in a vacuum oven at 160° C. for 3 hours. The cured product is a leather-like material of good strength and moldability which can be cold-drawn.

*Example 21*

202 parts of sebacic acid (1.0 mol)
49 parts of monoethanolamine (0.8 mol)
12 parts of diethanolamine (0.12 mol)

Following the procedure of Example 20 with heating periods of 17 hours and ¾ hour, respectively, a leather-like material of good strength and moldability which can be cold-drawn is obtained.

*Example 22*

101 parts of sebacic acid (0.5 mol)
26 parts of monoethanolamine (0.425 mol)
5¼ parts of diethanolamine (0.05 mol)

A stainless-steel kettle fitted with a mechanical agitator is charged with the sebacic acid and monoethanolamine, and agitation is started. The mix is heated to 180° C. under atmospheric pressure, the pressure in the kettle is then reduced to about 10 mm., the temperature is raised to 200° C., and the batch is heated under vacuum for 2 hours. The kettle is then restored to atmospheric pressure and the "first cook" continued for 16 hours at 200° C. under an atmosphere of carbon dioxide. Pressure is again reduced to 10 mm. and the first cook completed by heating under vacuum for 3½ hours more at 200° C.

The diethanolamine is then added to the batch and it is again heated, with agitation, under vacuum for ½ hour at 200° C. The viscous resin is discharged from the bottom outlet of the kettle into trays to cool to a tough, hard, brown wax softening at about 100° C.

The waxy product is cured, first in a mixer of the type described in Example 19 and then by heating for 3 hours in a vacuum oven at 160° C. The final cured product is a light-brown granular powder which can be readily molded in a positive mold at 150° C. and 2000–5000 p. s. i. to give somewhat flexible, glossy, leather-like molded articles. Molded sheets or discs of the material can be cold-calendered to make it stronger, tougher and more pliable, and to lower its brittle point.

Following are the results of physical tests to which injection molded articles of the material prepared as described above have been subjected:

| | |
|---|---|
| Dielectric strength at room temperature | 160 volts per mil |
| Dielectric constant at $10^6$ cycles | 5.7 |
| Arc resistance | 54 |
| Tensile strength | 2260 p. s. i. |
| Elongation | 18.3% |
| Izod impact | 1.2 ft. lbs./in. |
| Bending strength (perpendicular to injection axis) | 280 kgs./cm.$^2$ |
| Bending strength (parallel to injection axis) | 260 kgs./cm.$^2$ |
| A. S. T. M. flammability | 1.1 in./min. |
| Rockwell hardness (R and M scales) | 3.7 (20.6 kgs. on ½ ball) |
| | 3.1 (35.6 kgs. on ½ ball) |
| Brittle point | about 0° C. |

*Example 23*

101 parts of sebacic acid (0.5 mol)
26 parts of monoethanolamine (0.425 mol)
5¼ parts of diethanolamine (0.05 mol)

A stainless-steel kettle fitted with a mechanical agitator and a distilling condenser connected to a vacuum pump is charged with the sebacic acid and monoethanolamine, and agitation is started. The mix is heated in 3½ hours to 190° C. at atmospheric pressure with distillation of water. The pressure in the kettle is then reduced to 10 mm., the temperature is raised to 200° C., and the batch is so heated for 9 hours.

The diethanolamine is then added to the batch and the heating continued for 20 minutes. The viscous resin is discharged from the bottom outlet of the kettle into trays to cool to a tough, hard, cream-colored wax.

The waxy product is cured according to the procedure set out in Example 22. The tan-colored, granular powder obtained can be molded under heat and pressure. It handles well and can be sheeted out on hot milling rolls (about 140° C.).

Example 24

94 parts of azelaic acid (0.5 mol)
25.6 parts of monoethanolamine (0.425 mol)
5 parts of diethanolamine (0.05 mol)

A mixture of the azelaic acid and monoethanolamine is heated at 200° C. for 17 hours with continuous agitation provided by a stream of carbon dioxide gas bubbling through the mixture. The diethanolamine is added and heating continued until the resin becomes quite viscous. This viscous resin is poured in a shallow tray and cured in a vacuum oven at 160° C. for 12–16 hours. The cured resin sheet is tough and leathery, becoming soft and pliable when it is calendered.

Example 25

80 parts of pimelic acid (0.5 mol)
25.9 parts of monoethanolamine (0.425 mol)
5 parts of diethanolamine (0.05 mol)

The procedure of Example 24 is followed and a strong, pliable, leather-like sheet of material obtained.

Example 26

202 parts of sebacic acid (1.0 mol)
43 parts of monoethanolamine (0.7 mol)
11 parts of N-methyl monoethanolamine (0.15 mol)
10 parts of diethanolamine (0.1 mol)

All the ingredients except the diethanolamine are heated together, with agitation, at 200° C. for 18 hours while bubbling carbon dioxide through the batch. The diethanolamine is then added and the batch further heated at 200° C. until it becomes very viscous. It is then cured in thin layers in a vacuum oven at 160° C. for 12 hours. A strong, tough, leathery resin sheet is obtained.

If, however, the above procedure is followed using a molar ratio of monoethanolamine to N-methyl monoethanolamine of 0.57:0.28, a soft, pliable, leather-like sheet which is too soft to calender is obtained.

Example 27

202 parts of sebacic acid (1.0 mol)
43 parts of monoethanolamine (0.7 mol)
13 parts of N-ethyl monoethanolamine (0.15 mol)
10 parts of diethanolamine (0.1 mol)

All of the above ingredients except the diethanolamine are heated together, with agitation, at 200° C. for 18 hours while bubbling carbon dioxide through the batch. The diethanolamine is then added and the batch further heated at 200° C. until it becomes very viscous. It is then cured in thin layers in a vacuum oven at 160° C. for 12 hours. The cured resin sheet is tough, leathery and of good strength.

Example 28

202 parts of sebacic acid (1.0 mol)
39 parts of monoethanolamine (0.64 mol)
19 parts of N-ethyl monoethanolamine (0.21 mol)
10 parts of diethanolamine (0.1 mol)

The procedure of Example 27 is followed and the cured resin sheet obtained resembles a soft, pliable leather. It has good strength.

Example 29

202 parts of sebacic acid (1.0 mol)
43 parts of monoethanolamine (0.7 mol)
18 parts of N-butyl monoethanolamine (0.15 mol)
10 parts of diethanolamine (0.1 mol)

The sebacic acid, monoethanolamine and N-butyl monoethanolamine are heated together, with agitation, at 200° C. for 18 hours while bubbling carbon dioxide through the batch. The diethanolamine is then added and heating continued until the resin becomes very viscous. It is then poured onto trays and cured in a vacuum oven at 160° C. for 12 hours. A soft, pliable, leather-like product which is less brittle than a comparable resin containing no N-butyl monoethanolamine is obtained.

Example 30

202 parts of sebacic acid (1.0 mol)
27.4 parts of N-phenyl monoethanolamine (0.2 mol)
42.7 parts of monoethanolamine (0.7 mol)
8 parts of diethanolamine (0.08 mol)

The above ingredients are heated to 200°–205° C. in a suitable vessel and maintained at that temperature for 3½ hours while agitating by means of a stream of carbon dioxide gas. The viscous resin obtained is poured in a thin layer on shallow trays and cured for 8 hours in a vacuum oven at 160° C. The cured product is a soft, leather-like material of good strength and moldability. It can be cold-drawn.

Example 31

202 parts of sebacic acid (1.0 mol)
13.7 parts of N-phenyl monoethanolamine (0.1 mol)
42.7 parts of monoethanolamine (0.7 mol)
15 parts of diethanolamine (0.15 mol)

The above ingredients are heated for 1½ hours and further processed according to Example 30. A soft, leather-like material which can be cold-drawn is obtained.

Example 32

202 parts of sebacic acid (1.0 mol)
13.7 parts of N-phenyl monoethanolamine (0.1 mol)
48.8 parts of monoethanolamine (0.8 mol)
8 parts of diethanolamine (0.08 mol)

The procedure of Example 31 is followed. A leather-like material of good strength and moldability which can be cold-drawn is obtained.

Example 33

202 parts of sebacic acid (1.0 mol)
7 parts of N-phenyl monoethanolamine (0.05 mol)
53 parts of monoethanolamine (0.85 mol)
8 parts of diethanolamine (0.08 mol)

All of the above ingredients except the diethanolamine are heated to 200°-205° C. and maintained at that temperature for 17 hours while bubbling carbon dioxide through the mix. The diethanolamine is added and heating continued for ¾ hour.

The viscous resin is cured in a thin layer at 160° C. in a vacuum oven for 8 hours. The cured material is leather-like and of good strength and moldability, and it can be cold-drawn.

*Example 34*

202 parts of sebacic acid (1.0 mol)
3 parts of N-phenyl monoethanolamine (0.02 mol)
53.7 parts of monoethanolamine (0.88 mol)
8 parts of diethanolamine (0.08 mol)

The procedure of Example 30 is followed, the reaction mixture being heated for 2 hours. A leather-like material of good strength and moldability which can be cold-drawn is obtained.

*Example 35*

202 parts of sebacic acid (1.0 mol)
43 parts of monoethanolamine (0.7 mol)
20.6 parts of N-phenyl monoethanolamine (0.15 mol)
10 parts of diethanolamine (0.1 mol)

All of the above ingredients except the diethanolamine are heated together, with agitation, at 200° C. for 18 hours while bubbling carbon dioxide through the batch. The diethanolamine is then added and heating continued until the resin becomes very viscous. It is then poured onto trays and cured in a vacuum oven at 160° C. for 12 hours. The cured resin sheet is like a soft, pliable leather of good strength.

*Example 36*

202 parts of sebacic acid (1.0 mol)
39 parts of monoethanolamine (0.64 mol)
29 parts of N-phenyl monoethanolamine (0.21 mol)
10 parts of diethanolamine (0.10 mol)

The procedure of Example 35 is followed and a soft, pliable, leather-like material is obtained.

*Example 37*

202 parts of sebacic acid (1.0 mol)
12 parts of monoisopropanolamine (0.16 mol)
39 parts of monoethanolamine (0.64 mol)
10.5 parts of diethanolamine (0.1 mol)

All the ingredients except the diethanolamine are heated under a nitrogen atmosphere at 200°-205° C. for 22 hours. The diethanolamine is then added and the mixture heated for an additional 4 hours.

The reaction product, when dried in thin layers at 170° C. for 16 hours, is strong and leather-like and can be cold-drawn.

*Example 38*

202 parts of sebacic acid (1.0 mol)
32 parts of 2-amino-1-butanol (0.36 mol)
33 parts of monoethanolamine (0.54 mol)
7 parts of diethanolamine (0.07 mol)

All the above ingredients are placed in a suitable vessel and heated for 16 hours at 200°-205° C. while a stream of carbon dioxide gas is bubbled through the mixture.

The diethanolamine is then added to the reaction mixture ad heating is continued for 1 hour. The viscous product is poured into a shallow vessel and dried in a thin layer in a vacuum oven at 160° C. for 16 hours. The cured product resembles soft leather, it can be cold-drawn, it has a permanent set, it is elastic after permanent set, and it is of good strength.

*Example 39*

202 parts of sebacic acid (1.0 mol)
27 parts of 2-amino-1-butanol (0.3 mol)
36 parts of monoethanolamine (0.6 mol)
7 parts of diethanolamine (0.07 mol)

The procedure of Example 38 is followed with heating periods of 16 hours and 2 hours, respectively. The cured product obtained is leather-like, it can be cold-drawn, and it has a permanent set and good strength.

*Example 40*

404 parts of sebacic acid (2.0 mols)
54 parts of 2-amino-1-butanol (0.6 mol)
72 parts of monoethanolamine (1.2 mols)
14 parts of diethanolamine (0.14 mol)

Following the procedure of Example 38 with heating periods of 18 hours and 2 hours, respectively, a leather-like product of good strength which can be cold-drawn to a permanent set is obtained.

*Example 41*

202 parts of sebacic acid (1.0 mols)
20 parts of 2-amino-1-butanol (0.23 mol)
41 parts of monoethanolamine (0.67 mol)
7 parts of diethanolamine (0.07 mol)

Following the procedure of Example 38 with heating periods of 20 hours and ¾ hour, respectively, a leather-like product of good strength which can be cold-drawn to a permanent set is obtained.

*Example 42*

101 parts of sebacic acid (0.5 mol)
24 parts of monoethanolamine (0.4 mol)
5 parts of hydroxyethyl ethylene diamine (0.05 mol)

The sebacic acid and monoethanolamine are heated rapidly to 200° C. in a suitable open vessel. The heating is then continued at that temperature for 6 hours while a slow stream of nitrogen is passed through the reaction mixture.

The hydroxethyl ethylene diamine is added to the polyamide-polyester reaction product, and the mixture is heated in an open vessel for another 3 hours at 200° C. until the gel point of the resin is nearly reached. The resulting tough, waxy product is heated in an oven for 16 hours at 170° C. to obtain a sheet of leathery material.

A strip of the cured product is warmed to about 150° C. and immediately supercooled by plunging in ice water. The so-treated strip can then be readily cold-drawn by hand from three to four times its original length with a marked increase in strength of the material. If the drawn strip is warmed to 80°-100° C., it retracts to its original length.

A piece of the cured leathery product is calendered and elongated approximately 100% by passing it through cold milling rolls set at 0.023 inch clearance. Recalendering perpendicular to the original direction of calendering does not result in any further elongation in either direction. The calendered sheet is stronger and more pliable than the original sheet; warming the calendered sheet to 100° C. relaxes it to its original dimensions.

X-ray diffraction studies of the calendered sheet both before and after "relaxing" show that the polyester-polyamide resin is a crystallite which becomes highly oriented when calendered or cold-drawn. Physical tests indicate that the tensile strength of the resin increases markedly with elongation.

Example 43

101 parts of sebacic acid (0.5 mol)
24 parts of monoethanolamine (0.4 mol)
5 parts of diethylene triamine (0.05 mol)

The procedure of Example 42 is followed except that after addition of the triamine, the heating is continued for 4 hours. A leathery material is obtained.

A strip of the cured product is warmed to about 150° C. and immediately supercooled by plunging in ice water. The so-treated strip can then be readily cold-drawn by hand from three to four times its original length with a marked increase in strength of the material. If the drawn strip is warmed to 80°–100° C., it retracts to its original length.

A piece of the cured leathery product is calendered and elongated approximately 100% by passing it through cold milling rolls set at 0.023 inch clearance. Recalendering perpendicular to the original direction of calendering does not result in any further elongation in either direction. The calendered sheet is stronger and more pliable than the original sheet; warming the calendered sheet to 100° C. relaxes it to its original dimensions.

X-ray diffraction studies of the calendered sheet both before and after "relaxing" show that the polyester-polyamide resin is a crystallite which becomes highly oriented when calendered or cold-drawn. Physical tests indicate that the tensile strength of the resin increases markedly with elongation.

Example 44

101 parts of sebacic acid (0.5 mol)
33.7 parts of n-propanolamine (0.45 mol)
4 parts of diethanolamine (0.04 mol)

The sebacic acid and n-propanolamine are heated at 200° C. for 17 hours while a stream of carbon dioxide is bubbled therethrough. The diethanolamine is added and heating continued for 1½ hours.

The resin obtained is poured onto a shallow tray and cured in a vacuum oven at 160° C. for 7 hours. The cured sheet of material is pliable and leather-like, it is of good strength, and it may be cold-drawn. Moreover, it does not fibrate when calendered.

Example 45

101 parts of sebacic acid (0.5 mol)
32 parts of n-propanolamine (0.425 mol)
5 parts of diethanolamine (0.05 mol)

The above ingredients are heated together at 200° C. for 2½ hours with continuous agitation by a stream of carbon dioxide. The viscous resin obtained is poured in a shallow tray and cured by heating in a vacuum oven at 160° C. for 12–16 hours.

The cured resin sheet stripped from the tray is tough and leathery with a brittle point of −8° C. (18° F.). When the sheet is cross-calendered to about one-half its original thickness, it becomes very soft and pliable, resembling soft kid leather. It is nearly clear, mechanically strong and has a brittle point below −20° C.

Example 46

202 parts of sebacic acid (1.0 mol)
42.7 parts of monoethanolamine (0.7 mol)
21 parts of diethanolamine (0.2 mol)

A mixture of the sebacic acid and monoethanolamine is heated rapidly in an open vessel to 200° C. The mix is then transferred to another vessel in which it is heated for 18 hours at 200°–205° C. A stream of nitrogen is passed through the vessel during the heating.

The diethanolamine is then added and the heating continued in the presence of nitrogen to near the gel point, i. e., for about 1 hour. The product is poured in a thin layer on a shallow tray and cured by heating in an oven at 170° C. for 16 hours. The cooled product is strong and elastic and may be cold-drawn. The resin is stiff before drawing and somewhat elastic afterward.

Example 47

202 parts of sebacic acid (1.0 mol)
36.6 parts of monoethanolamine (0.6 mol)
21 parts of diethanolamine (0.2 mol)

The procedure of Example 46 is followed, the reaction mixture being heated anywhere from a half-hour to two hours after the addition of the diethanolamine. A stiff elastic material which may be cold-drawn to produce an elastic product is obtained.

Example 48

202 parts of sebacic acid (1.0 mol) are heated with 48 parts of monoethanolamine (0.8 mol) at a temperature of about 200°–205° C. for 17 hours during which time the surface of the reacting mixture is covered with a blanket of carbon dioxide gas. About 5 parts of glycerol (0.05 mol) are added to the reacting mixture and the heating continued for about 1 hour, after which the resin is cured by heating at 150°–155° C. in a vacuum of 28 inches of mercury for about 18–20 hours. The curing is preferably carried out with the resin in sheet form. During the curing the resin passes through a transition from a waxy material to a horny, transparent sheet.

Example 49

Example 48 is repeated except that 6 parts of pentaerythritol are substituted for the glycerol. A product having properties very similar to those of the product of Example 48 is obtained.

Example 50

101 parts of sebacic acid (0.5 mol)
24 parts of monoethanolamine (0.4 mol)
5 parts of glycerol (0.05 mol)

The sebacic acid and monoethanolamine are heated rapidly to 200° C. in a suitable open vessel. The heating is then continued at that temperature for 6 hours while a slow stream of nitrogen is passed through the reaction mixture.

The glycerol is added to the polyamide-polyester reaction product, and the mixture is heated in an open vessel for another 9 hours at 200° C. until the gel point of the resin is reached. This tough, waxy product is heated in an oven for 16 hours at 170° C. to obtain a sheet of leathery material.

A strip of the cured product is warmed to about 150° C. and immediately supercooled by plunging in ice water. The so-treated strip can then be readily cold-drawn by hand from three to four times its original length with a marked increase in strength of the material. If the drawn strip is warmed to 80°–100° C., it retracts to its original length.

A piece of the cured leathery product is calendered and elongated approximately 100% by passing it through cold milling rolls set at 0.023 inch clearance. Recalendering perpendicular to the original direction of calendering does not result in any further elongation in either direction. The calendered sheet is stronger and more pliable than the original sheet; warming the calendered sheet to 100° C. relaxes it to its original dimensions.

X-ray diffraction studies of the calendered sheet both before and after "relaxing" show that the polyester-polyamide resin is a crystallite which becomes highly oriented when calendered or cold-drawn. Physical tests indicate that the tensile strength of the resin increases markedly with elongation.

*Example 51*

101 parts of sebacic acid (0.5 mol)
24 parts of monoethanolamine (0.4 mol)
6 parts of pentaerythritol (0.05 mol)

The procedure of Example 50 is followed except that the second heating period is for about 3 hours, and a soft leathery material is obtained.

Saturated aliphatic dicarboxylic acids which may be used in the present invention are those which do not form an anhydride upon heating. Acids having at least four carbon atoms between the two carboxyl groups are preferred. Examples of suitable acids are adipic acid, azelaic acid, sebacic acid, pimelic acid, brassylic acid, suberic acid, etc.

In order to obtain a leathery product which can be calendered and/or cold-drawn, a primary straight-chain monoalkylolamine, for example monoethanolamine, mono - n - propanolamine, mono-n-butanolamine, etc., must be condensed with the saturated aliphatic dicarboxylic acid.

Minor proportions of the primary straight-chain monoalkylolamine may be replaced by other monoalkylolamines. Examples of some of these are isopropanolamine, the branched chain monobutanolamines, 2-amino-3-hexanol, 3-amino-4-heptanol, 2 - amino-4-pentanol, 5-amino-4-octanol, 3-amino-3-methyl-2-butanol, 2-amino-2-methyl-3-hexanol, 2-amino-2-methyl-1-butanol, 3-amino-3-methyl-2-butanol, 3-amino-3-methyl-4-heptanol, 3-amino-2-methyl-4-heptanol, etc. Secondary amines such as N-alkyl, N-aryl and N-aralkyl monoalkylolamines may also be used in combination with the primary straight-chain monoalkylolamines in minor proportions. Examples are N-phenyl monoethanolamine, N-benzyl monoethanolamine, N-phenylethyl monoethanolamine, N-butyl monoethanolamine, N-methyl monoethanolamine, etc.

Obviously, mixtures of two or more primary straight-chain monoalkylolamines may be used in place of any single alkylolamine of the type and, moreover, mixtures of two or more non-primary and/or non-straight-chain monoalkylolamines may replace a minor proportion of the primary, straight-chain monoakylolamine.

Just how low a molar proportion of primary straight-chain monoalkylolamine can be present, at the same time still retaining the cold-drawing and/or calendering properties of the resin produced, depends upon the particular alkylolamine which is being introduced into the composition. In general, no more than about 40% of the primary, straight-chain monoalkylolamine should be replaced by other type monoalkylolamines, and we prefer to replace no more than about 25% thereof.

Suitable polyfunctional compounds, those having at least three hydroxyl or amino or hydroxyl and amino groups, may be selected from the groups of aliphatic amino alcohols, polyhydric alcohols and polyamines. Examples of some of these polyfunctional compounds are diethanolamine, the dipropanolamines, the dibutanolamines, hydroxyethylethylene diamine, trimethylol aminomethane, N-hydroxyethyl diethylenetriamine, triethylene tetramine, tetraethylene pentamine, di-n-propylene triamine, glycerol, pentaerythritol, dipentaerythritol, etc.

If desired, the saturated aliphatic dibasic acid, the monoalkylolamine and the polyfunctional compound may be reacted together in one step. The reaction time is, of course, shorter using this procedure than it is when the reactants are combined in two stages, i. e., first reaction of the dicarboxylic acid and monoalkylolamine and then addition of the polyfunctional compound to the product obtained. The invention is not limited to either of the particular processes since both are perfectly operable as evidenced by the examples.

The process of the present invention may be carried out at temperatures between about 180° and 220° C. and preferably at about 200° C. This reaction temperature applies to the single heating period if the one-step process is used as well as to both of the heating periods if the two-step process is used. The reaction is advantageously carried out under reduced pressure, e. g. from about 1–10 mm. of mercury. The time of reaction will be dependent upon the pressure and will also vary in accordance with the particular reactants, the size of the batch, the heat transfer, etc. Generally under reduced pressures of from 1–10 mm. of mercury the reaction will require from about 6–8 hours, while with higher pressures the time will be correspondingly longer. If the reactants be heated under atmospheric pressure for a time and then for an equivalent period under reduced pressures of from about 1–10 mm. of mercury, the total reaction time will be about doubled. If the entire reaction be carried out at atmospheric pressure, the reaction time will be about two to three times that prevailing when the entire reaction is carried out under reduced pressure.

It is preferable that the acid and alcohol-amine reactants be employed in approximately stoichiometrically equivalent proportions, but a slight excess of one of the reactants does not necessarily do any harm. In order to obtain products of the desired properties, however, it is essential that the proportions of reactants be carefully controlled, and we have found that leather-like products can be obtained by reacting the saturated aliphatic dicarboxylic acid, the primary straight-chain monoalkylolamine, and the polyfunctional compound in accordance with the present invention in the following molar ratios:

| moles dibasic acid | moles primary straight-chain monoalkylolamine | moles polyfunctional compound |
|---|---|---|
| 1 | 0.6 to 1 | |
| 1 | | 0.05 to 0.2 |
| 1 | 0.8 to 1.1 | |

For example, while the ratio of dibasic acid to primary straight-chain monoalkylolamine may vary from about 1:0.6 to about 1:1 and that of dibasic acid to polyfunctional compound from about 1:0.05 to about 1:0.2, the ratio of dibasic acid to total alcohol-amine components may not vary beyond about 1:0.8 to about 1:1.1. We prefer reacting the ingredients of the desired leather-like resin in the molar proportions of about 1:0.85:0.15, but the invention is in no sense limited to this preferred embodiment.

The generally waxy product obtained upon reaction of saturated aliphatic dicarboxylic acid, primary straight-chain monoalkylolamine, and polyfunctional compound according to the process of the present invention is cured by heating. When the products are cured in the presence of air, surface oxidation apparently occurs and as a result, the surface of the cured sheet becomes black and glossy. This black film is less elastic than the undersurface and accordingly, curing under vacuum is advisable. The curing temperature is not critical and may range from about 100°–200° C. We prefer curing temperatures of about 150° to 180° C.

The leather-like products of the present invention can be cured in a granular form and they can be molded to obtain homogeneous leather-like articles. Molding can be carried out by injection or by compression. Moreover, molded sheets can be cold-calendered whereby the material is partially oriented to yield a hard leather-like substance which is especially useful as sole leather.

The products of the present invention can also be cured in sheet form, and the resulting leather-like sheets can be cold-drawn or calendered.

In a semi-cured form the products can be used, for example, to impregnate paper, textiles, fibrous materials, etc.

The leather-like materials of the present invention have many uses as leather substitutes. Some of these include the fabrication of shoes, belts, aprons, gaskets, pump diaphragms, purses, wallets, traveling bags, seat coverings for vehicles, upholstery, shoe sole leather, etc. They can be cold-drawn into sheets, fibers, etc., molded into various shapes as bottle tops, containers, etc., and extruded as filaments, rods, tubes, etc. In general, they find application in many industrial fields including laminating, coating, impregnating, etc.

The resins of the present invention may be mixed with ester gum and various alkyd resins, particularly the oil-modified air-drying resins, to produce lacquers, varnishes, enamels, etc. They may also be incorporated with phenol-formaldehyde resins, urea-formaldehyde resins, thiourea-formaldehyde resins, melamine - formaldehyde resins and other amino-aldehyde resins, etc.

Obviously suitable fillers, dyes and pigments may be mixed with the resins to modify the properties thereof as may be desirable.

While we do not wish to be limited to any particular theory of mechanism of reaction, we believe that the saturated aliphatic dicarboxylic acid and the primary straight-chain monoalkylolamine first react to form an alkylolamide, which amide then self-esterifies to build up a linear polymer. The polyfunctional compound effects cross-linking of the linear polymers, thus producing a flexible or elastic product which, however, has a high tensile strength.

The products of the present invention may vary rather widely in appearance but have in common a definite, highly oriented crystalline structure, they may be cured by mere heating, and they may be cold-drawn and/or calendered.

We claim:

1. A process which comprises bringing about reaction between a primary straight chain monoalkylolamine of the formula HO—Y—NH$_2$ in which Y is a divalent, straight-chain, saturated aliphatic hydrocarbon radical, a saturated aliphatic hydrocarbon dicarboxylic acid which does not form an anhydride upon heating and a polyfunctional compound selected from the group consisting of aliphatic hydrocarbon polyhydric alcohols containing at least three hydroxyl groups, aliphatic hydrocarbon polyamines having at least three amino groups with a hydrogen atom attached to each amino nitrogen atom and aliphatic hydrocarbon amino alcohols containing at least three hydroxyl groups and amino groups with a hydrogen atom attached to each amino nitrogen atom, the molar ratio of dicarboxylic acid to monoalkylolamine being from 1:0.6 to 1:1, that of dicarboxylic acid to polyfunctional compound being from 1:0.05 to 1:0.2 and that of dicarboxylic acid to total monoalkylolamine and polyfunctional compound being from 1:0.8 to 1:1.1, and curing the reaction product by heating.

2. A process which comprises bringing about reaction between a primary straight-chain monoalkylolamine of the formula HO—Y—NH$_2$ in which Y is a divalent, straight-chain, saturated aliphatic hydrocarbon radical and a saturated aliphatic hydrocarbon dicarboxylic acid which does not form an anhydride upon heating, then bringing about reaction between the product so obtained and a polyfunctional compound selected from the group consisting of aliphatic hydrocarbon polyhydric alcohols containing at least three hydroxyl groups, aliphatic hydrocarbon polyamines having at least three amino groups with a hydrogen atom attached to each amino nitrogen atom and aliphatic hydrocarbon amino alcohols containing at least three hydroxyl groups and amino groups with a hydrogen atom attached to each amino nitrogen atom, the molar ratio of dicarboxylic acid to monoalkylolamine being from 1:0.6 to 1:1, that of dicarboxylic acid to polyfunctional compound being from 1:05 to 1:0.2 and that of dicarboxylic acid to total monoalkylolamine and polyfunctional compound being from 1:0.8 to 1:1.1, and curing the reaction product by heating.

3. A polyester-polyamide having a definite, highly oriented, crystalline structure which is a heat cured condensation product of a primary straight-chain monoalkylolamine of the formula HO—Y—NH$_2$ in which Y is a divalent, straight-chain, saturated aliphatic hydrocarbon radical, a saturated aliphatic hydrocarbon dicarboxylic acid which does not form an anhydride upon heating, and a polyfunctional compound selected from the group consisting of aliphatic hydrocarbon polyhydric alcohols containing at least three hydroxyl groups, aliphatic hydrocarbon polyamines having at least three amino groups with a hydrogen atom attached to each amino nitrogen atom and aliphatic hydrocarbon amino alcohols containing at least three hydroxyl groups and amino groups with a hydrogen atom attached to each amino nitrogen atom, wherein the molar ratio of dicarboxylic acid to monoalkylolamine is from 1:0.6 to 1:1, that of dicarboxylic acid to polyfunctional compound is from 1:0.05 to 1:0.2 and that of dicarboxylic acid to total monoalkylolamine and polyfunctional compound is from 1:0.8 to 1:1.1.

4. A polyester-polyamide having a definite, highly oriented, crystalline structure which is a heat cured condensation product of a primary straight-chain monoalkylolamine of the formula HO—Y—NH₂ in which Y is a divalent, straight-chain, saturated aliphatic hydrocarbon radical, a saturated aliphatic hydrocarbon dicarboxylic acid which does not form an anhydride upon heating and an aliphatic hydrocarbon polyhydric alcohol containing at least three hydroxyl groups, wherein the molar ratio of dicarboxylic acid to monoalkylolamine is from 1:0.6 to 1:1, that of dicarboxylic acid to polyhydric alcohol is from 1:0.05 to 1:0.2 and that of dicarboxylic acid to total monoalkylolamine and polyhydric alcohol is from 1:0.8 to 1:1.1.

5. A polyester-polyamide having a definite, highly oriented, crystalline structure which is a heat cured condensation product of a primary straight-chain monoalkylolamine of the formula HO—Y—NH₂ in which Y is a divalent, straight-chain, saturated aliphatic hydrocarbon radical, a saturated aliphatitc hydrocarbon dicarboxylic acid which does not form an anhydride upon heating and an aliphatic hydrocarbon polyamine having at least three amino groups with a hydrogen atom attached to each nitrogen atom, wherein the molar ratio of dicarboxylic acid to monoalkylolamine is from 1:0.6 to 1:1, that of dicarboxylic acid to polyamine is from 1:0.05 to 1:0.2 and that of dicarboxylic acid to total monoalkylolamine and polyamine is from 1:0.8 to 1:1.1.

6. A polyester-polyamide having a definite, highly oriented, crystalline structure which is a heat cured condensation product of a primary straight-chain monoalkylolamine of the formula HO—Y—NH₂ in which Y is a divalent, straight-chain, saturated aliphatic hydrocarbon radical, a saturated aliphatic hydrocarbon dicarboxylic acid which does not form an anhydride upon heating and an aliphatic hydrocarbon amino alcohol containing at least three hydroxyl groups and amino groups with a hydrogen atom attached to each amino nitrogen atom, wherein the molar ratio of dicarboxylic acid to monoalkylolamine is from 1:0.6 to 1:1, that of dicarboxylic acid to amino alcohol is from 1:0.05 to 1:0.2 and that of dicarboxylic acid to total monoalkylolamine and amino alcohol is from 1:0.8 to 1:1.1.

7. A polyester-polyamide having a definite, highly oriented, crystalline structure which is a heat cured condensation product of sebacic acid, monoethanolamine and diethanolamine in a molar ratio of 1:0.85:0.15.

8. A process according to claim 1 in which reaction is effected by heating to a temperature of from 180° to 220° C.

9. A process according to claim 1 in which the reaction product is cured by heating at a temperature of 150° to 180° C. under reduced pressure.

DAVID W. JAYNE, JR.
HAROLD M. DAY.
EDWARD L. KROPA.

REFERENCES CITED

The following references are of record in the file of this patent:

UNITED STATES PATENTS

| Number | Name | Date |
|---|---|---|
| 2,333,639 | Christ et al. | Nov. 9, 1943 |
| 2,363,581 | Frosch | Nov. 28, 1944 |
| 2,403,533 | Kazuba | July 9, 1946 |

FOREIGN PATENTS

| Number | Country | Date |
|---|---|---|
| 376,929 | Great Britain | July 21, 1932 |